United States Patent
Doerr (10) Patent No.: US 8,131,120 B2
(45) Date of Patent: Mar. 6, 2012

(54) PLANAR POLARIZATION SPLITTER

(75) Inventor: Christopher Richard Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 649 days.

(21) Appl. No.: 12/194,352

(22) Filed: Aug. 19, 2008

(65) Prior Publication Data

US 2010/0046886 A1 Feb. 25, 2010

(51) Int. Cl.
*G02B 6/00* (2006.01)
*G02B 6/26* (2006.01)
*G02B 6/42* (2006.01)

(52) U.S. Cl. .............. 385/11; 385/27; 385/39; 385/40

(58) Field of Classification Search ........... 385/11
See application file for complete search history.

(56) References Cited

U.S. PATENT DOCUMENTS

| | | | |
|---|---|---|---|
| 6,400,860 B1 * | 6/2002 | Chandrasekhar et al. | 385/24 |
| 2003/0081873 A1 * | 5/2003 | Tan et al. | 385/11 |
| 2003/0095737 A1 | 5/2003 | Welch et al. | |
| 2004/0096143 A1 | 5/2004 | Shpantzer et al. | |
| 2004/0151423 A1 | 8/2004 | Izhaky et al. | |
| 2004/0263802 A1 | 12/2004 | Seki et al. | |
| 2005/0058386 A1 * | 3/2005 | Little | 385/11 |
| 2006/0013296 A1 | 1/2006 | Carrer et al. | |
| 2007/0196042 A1 | 8/2007 | Little | |

OTHER PUBLICATIONS

Hu, M.H., et al.; "Tunable Mach-Zehnder Polarization Splitter Using Height-Tapered Y-Branches", IEEE Photonics Technology Letters, vol. 9, No. 6, Jun. 1997, pp. 773-775.
Soldano, et al.; "Mach Zehnder Interferometer Polarization Splitter in InGaAsp/InP"; IEEE Photonics Technology Letters, vol. 6, No. 3, Mar. 1994; pp. 402-405.
Shani, et al.; "Four-Port Integrated Optic Polarization Splitter"; Jan. 20, 1990, vol. 29, No. 3, Applied Optics; pp. 337-339.

* cited by examiner

*Primary Examiner* — Uyen Chau N Le
*Assistant Examiner* — Kajli Prince
(74) *Attorney, Agent, or Firm* — Hitt Gaines, PC (57) ABSTRACT

An apparatus comprising a planar optical structure that includes an input coupler, first and second planar waveguides and an output coupler, all on a planar substrate. The input coupler is configured to divide an incoming light into two input light beams. Each of the first and second waveguides is configured to receive one of the two input light beams. The first waveguide has a first core with a width that is greater than a width of a second core of the second waveguide. At least one of the first or second planar waveguides is birefringent. The output coupler is configured to receive the light beams after passage through the first and second waveguides. A first output light beam from the output coupler is substantially TE polarized light and a second output light beam from the output coupler is substantially TM polarized light.

18 Claims, 5 Drawing Sheets

PLANAR POLARIZATION SPLITTER

CO-PENDING RELATED PATENT APPLICATION

The present patent application is related to a concurrently filed patent application entitled, "MONOLITHIC COHERENT OPTICAL DETECTORS" to Y. K. Chen, et al., Ser. No. 12/229,983, filed on Aug. 28, 2008 which is commonly assigned with the present application and incorporated by reference in its entirety.

TECHNICAL FIELD OF THE INVENTION

The present disclosure is directed, in general, to polarization splitters, and, methods using and of manufacturing thereof.

BACKGROUND OF THE INVENTION

This section introduces aspects that may be helpful to facilitating a better understanding of the inventions. Accordingly, the statements of this section are to be read in this light. The statements of this section are not to be understood as admissions about what is in the prior art or what is not in the prior art.

Polarization splitters split polarized light into transverse electric (TE) and transverse magnetic (TM) polarized light. Mach-Zehnder interferometer type polarization splitters may be used in a number of optical telecommunication applications, such as polarization diversity receivers, polarization shift keying and polarization diversity multiplexing. For broadest applicability, it would be desirable for the polarization splitter to be operable over a wide range of wavelengths, for example, the entire C-band wavelength range. Providing such wavelength insensitivity in a low-cost and compact designed apparatus has been problematic, however. For instance, some previous efforts require additional processing steps to selectively deposit metal layers on or near one of the waveguides to induce or change the birefringent properties of the waveguide and thereby achieve a split in polarized light. In addition to requiring additional processing steps, such designs can have substantial insertion losses. Other efforts require the deposition of a stress-inducing material in the vicinity of one waveguide to induce or change the birefringent properties of the waveguide and thereby achieve the desired split in polarized light. Again, this requires additional processing steps to place the stress-inducing material near the waveguide. Yet other efforts require nano-lithography to create very small features. Again, this requires special processing steps and equipment.

SUMMARY OF THE INVENTION

One embodiment is an apparatus comprising a planar optical structure. The planar optical structure includes an input coupler, first and second planar waveguides and an output coupler. The input coupler, the first and second waveguides and the output coupler are all on a planar substrate. The input coupler is configured to divide an incoming light into two input light beams. Each of the first and second waveguides is configured to receive one of the two input light beams. The first waveguide has a first core with a width that is greater than a width of a second core of the second waveguide, and, at least one of the first or second planar waveguides is birefringent. The output coupler is configured to receive the light beams after passage through the first and second waveguides. A first output light beam from the output coupler is substantially transverse electric polarized light and a second output light beam from the output coupler is substantially transverse magnetic polarized light.

Still another embodiment is a method of using an apparatus. The method includes splitting an incoming light into separate transverse electric and transverse magnetic polarized output light beams. Splitting the incoming light includes passing a part of the incoming light to a first planar waveguide of a planar polarization splitter. Splitting the incoming light also includes passing a remaining part of the incoming light to a second planar waveguide of the planar polarization splitter. The first waveguide has a first core with a width that is greater than a width of a second core of the second waveguide, and, at least one of the first or second planar waveguides is birefringent. Splitting the incoming light also includes optically mixing output light from the first and second planar waveguides through an output coupler.

Another embodiment is a method of manufacturing an apparatus that comprises fabricating a planar optical structure. Forming the planar optical structure includes forming a semiconductor alloy layer on a planar substrate and forming a material layer on the semiconductor alloy layer. The material layer and the substrate have refractive indexes that are less than a refractive index of the semiconductor alloy layer. Forming the planar optical structure also includes patterning the material layer and the semiconductor alloy layer to form separated first and second waveguides. A width of a first core of the first waveguide is greater than a width of a second core of the second waveguide, and, at least one of the first or second planar waveguides is birefringent.

BRIEF DESCRIPTION OF THE DRAWINGS

The embodiments of the disclosure are best understood from the following detailed description, when read with the accompanying FIGUREs. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

It was discovered that changing the width in two ridge waveguides can in itself cause sufficient changes in the effective refractive indexes of TM and TE polarized light so as to provide a desired phase shift over reasonably short propagation distances. A 180-degree phase differences between the accumulated phase difference between TE and TM light between the two waveguides can be implemented for compact polarization splitter designs by placing the two waveguides in an interferometer. For instance, for short planar waveguide lengths (e.g., less than about 500 microns) two waveguide cores having appropriately different widths can provide 180-degree phase shifts in the TE or TM light output between the two waveguides.

In a polarization splitting application of such a structure, the 180-degree phase-shifted light can be passed through a coupler to provide two outputs: one output that is substantially TE polarized light and another output that is substantially TM polarized light. In a polarizer application, only one of the substantially TE and TM polarized light outputs may be used. In a polarization combiner application, the two substantially TE and TM polarized lights can be combined.

It was unexpected that such results could be obtained for such short-lengthened planar waveguides. It was originally thought that much longer waveguide lengths would be required to achieve significant changes in the refractive indexes, and therefore, a polarization beam splitter, combiner or polarizer implementing this design would not be a practical design. Surprisingly, the combination of using ridge waveguides with thin cores and having a large refractive index difference between the core and cladding outside the waveguide's ridge resulted in larger than expected changes in these refractive indexes for short planar waveguide lengths.

The thickness of the core is such that the light is approximately maximally confined in the vertical direction, under the constraint that the waveguide guides only one mode vertically. For any waveguide, as the core thickness is reduced, the fundamental optical mode in the waveguide becomes smaller vertically until the thickness reaches a maximum confinement thickness. A further decrease causes the optical mode to become larger vertically again. The benefit of making the mode as small as possible vertically is it results in the largest possible birefringence. It also squeezes the mode outwards horizontally, making the mode amplitude large at the ridge waveguide walls. Both effects make the birefringence of the waveguide more sensitive to changes in waveguide width. The more sensitive the birefringence to waveguide width is, the shorter the polarization splitter can be.

The term TE polarized light, as used herein, means that for light in TE mode, the electric field is transverse to the direction of propagation. The term TM polarized light, as used herein, means that for light in TM mode, the magnetic field is transverse to the direction of propagation. In some embodiments where the light is passing through the waveguide described herein, the TE polarized light has its electric field oscillating predominantly parallel to a substrate, and, the TM polarized light, has its magnetic field oscillating predominantly parallel to the substrate. The disclosure realizes that in integrated optics often uses impure TE and TM polarized light. For instance, excluding circular waveguides, typically only a one-dimensional confined mode has pure TE or pure TM polarized light. In other cases, these may be referred to as quasi-TE and quasi-TM polarized light. Thus, as used herein, reference to TE and TM polarized light (e.g., in the context of integrated optics) includes quasi-TE and quasi-TM polarized light.

For the purposes of the present disclosure, the term, substantially TE polarized light, means that the ratio of TE to TM polarized light is equal to or greater than about 20:1 in power. Similarly, substantially TM polarized light means that the ratio of TM to TE polarized light is equal to or greater than about 20:1 in power. One of ordinary skill would be aware of methods to assess the purity of TE or TM polarized light. For example, to verify exclusive TE or TM polarized light, one could place a polarizer in the path of an output port from a polarization splitter, with the polarizer aligned so as to maximally block TE polarized light. If the output from the port is substantially TE polarized light, then the so-aligned polarizer will block at least about 95 percent of light, as compared to the polarizer aligned so as to permit the full passage of TE polarized light. A similar verification could be applied to verify the exclusive presence of TM polarized light, with the polarizer rotated 90 degrees compared to the alignments needed to fully block or fully pass the TE polarized light.

Figure 1:
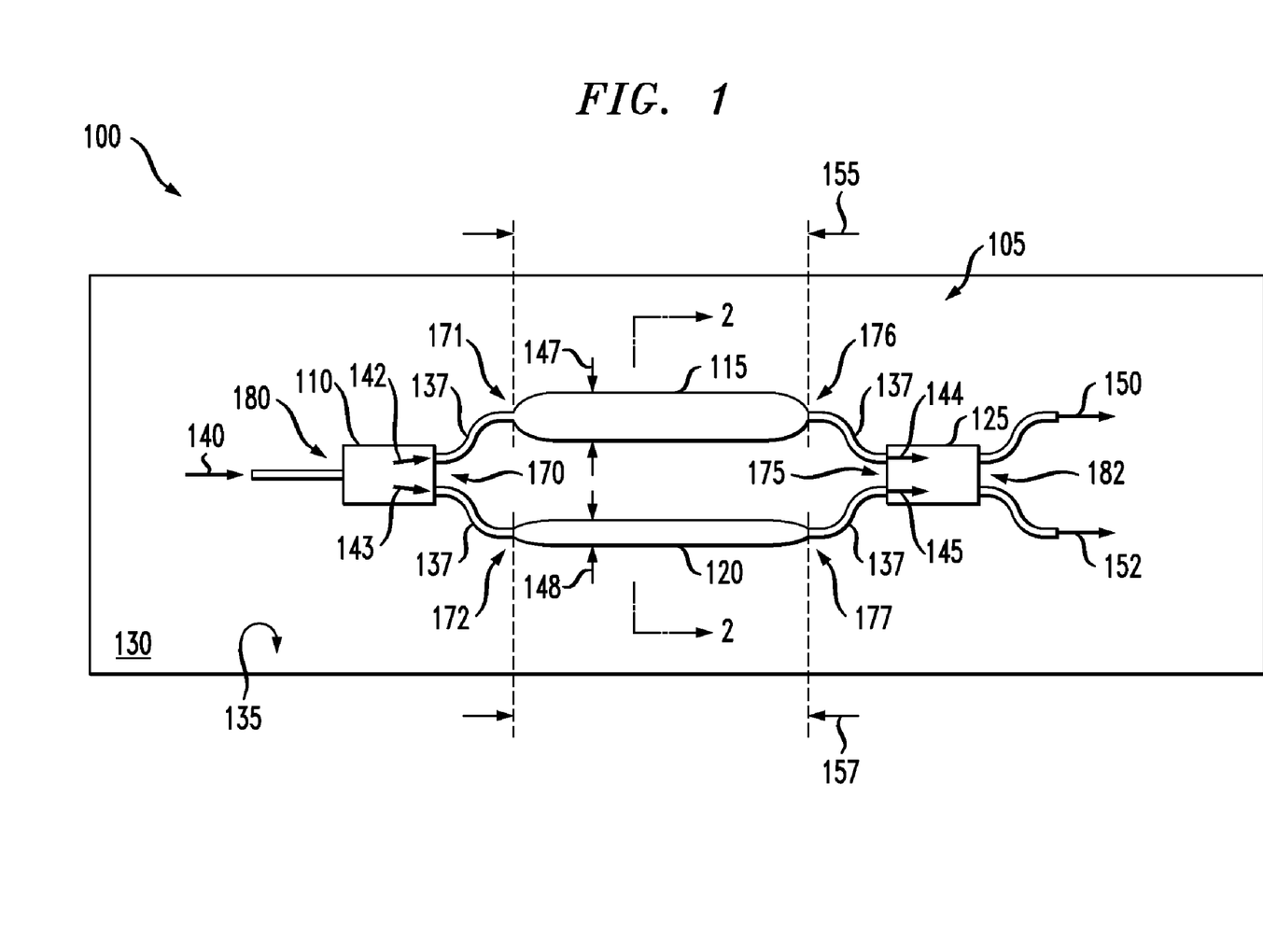
FIG. 1 presents a detailed plan view of an example apparatus having a planar optical structure.

FIG. 1 presents a detailed plan view of an example apparatus 100 having a planar optical structure 105. In some embodiments, the apparatus 100 is, or is part of, a photonic integrated circuit. Certain overlying structures of the apparatus (e.g., wires, capacitors, planarizing layer etc . . . ) are not shown so that certain components of the planar polarization splitter 105 can be more clearly depicted.

The example to follow presents the planar optical structure 105 configured as a planar polarization splitter. In other embodiments however, the same structure 105 could be used in the reverse direction when configured as a planar polarization combiner. Or, when the structure 105 is configured as a planar polarizer, only one of the substantially TE or TM polarized light outputs is used.

The planar polarization splitter 105 includes an input coupler 110, first and second planar waveguides 115, 120 and an output coupler 125. The input coupler 110, first and second planar birefringent waveguides 115, 120 and output coupler 125 are all located on a planar substrate 130. That is, the substrate 130 has a planar surface 135 that these components are located on. These components 110, 115, 120, 125 can be optically coupled, such as shown in FIG. 1, by light guiding structures 137 (e.g., waveguides). At least one of the first or second planar waveguide 115, 120 is birefringent. In some embodiments, only one waveguide 115, 120 is birefringent. That is one of the two waveguides 115, 120 is birefringent, and the other waveguide is not birefringent.

The planar optical structure 105 configured as a planar polarization splitter can be configured to polarization separate an incoming light 140. The input coupler 110 is configured to divide the incoming light 140 (e.g., transversely polarized light or non-polarized light) into two separate but equal input light beams 142, 143. In some embodiments, the input coupler 110 is a 1-by-2 coupler. An exemplary type of 1-by-2 coupler is a multimode interference (MMI) coupler. In some embodiments, the incoming light 140 is in the C-band wavelength range (e.g., about 1.52 to 1.56 microns). However, other incoming wavelengths of light used in optical communications could be used, if desired.

The output coupler 125 is configured to receive the input light beams 142, 143 after their passage through the first and second waveguides 115, 120. That is, output light beams 144, 145 from the first and second waveguides serve as input light to the output coupler 125. A first output light beam 150 from the second coupler 125 is substantially TE polarized light, and, a second output light beam 152 from the second coupler 125 is substantially TM polarized light. Alternatively, the first output light 150 could be substantially TM polarized light and the second output light 152 could be substantially TE polarized light. In some embodiments, the output coupler 125 is a 2-by-2 coupler. An exemplary type of 2-by-2 coupler is an MMI coupler.

Figure 2:
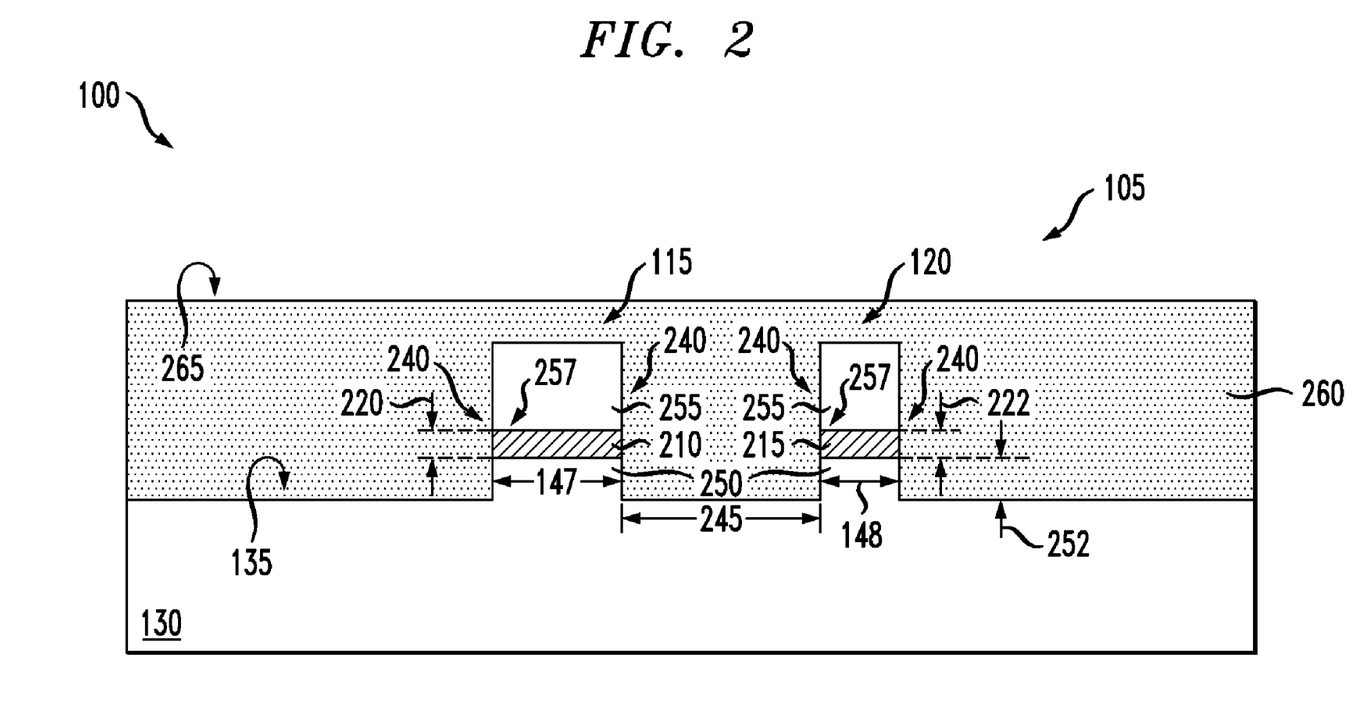
FIG. 2 presents a cross-sectional detailed view of the example planar optical structure of FIG. 1.

FIG. 2 presents a cross-sectional detailed view along view line 2-2 of the example planar polarization splitter 105 of FIG. 1. As illustrated in FIG. 2, some embodiments of the planar waveguides 115, 120 are ridge waveguides. One skilled in the art would be familiar with the various types of ridge waveguide or other waveguide designs that could be used.

The first and second planar birefringent waveguides 115, 120 include first and second cores 210, 215, respectively. The cores 210, 215 are transparent to the incoming light 140 (FIG. 1). The term transparent as used herein means that the band gap wavelengths of the cores 210, 215 are at least about 0.05 microns lower than the wavelength of the incoming light 140. For example, cores 210, 215 composed of indium gallium arsenide phosphide (InGaAsP), having a band gap wavelength of about 1.4 microns, are suitable for incoming light 140 in the C-band wavelength range.

As further illustrated in FIGS. 1 and 2, the first waveguide 115 has a first core 210 with a width 147 that is greater than a width 148 of a second core 215 of the second waveguide 120. Each of the first and second waveguides 115, 120 are configured to receive one of the two input light beams 142, 143.

As noted above, the waveguides 115, 120 are birefringent. The materials that the waveguides 115, 120 are made of (e.g., core and cladding materials) are not necessarily inherently birefringent, although inherently birefingent materials could be used, if desired. However, the asymmetric geometric shapes of the waveguides can impart the waveguides with birefringence. For instance, having cores 210, 215 that are substantially thinner than they are wide can impart the waveguides 115, 120 with birefringence. In some cases, for example a ratio of thicknesses 220, 222 to widths 147, 148 for the cores 210, 215 can range from about 1:5 to 1:45.

Providing thin core planar waveguide cores 210, 215 facilitates imparting the waveguides 115, 120 with birefringent properties, and, facilitating adjusting the refractive indexes of TM and TE polarized light as a function of the core widths 147, 148. For some embodiments, the first and second cores 210, 215 have thicknesses 220, 222 that are less than or equal to a core thickness that would give maximum vertical confinement in the waveguides 115, 120. For example, the thicknesses 220, 222 can be less than the maximum confinement thickness of about 0.28 microns, for some embodiments. The maximum confinement thickness provides the largest sensitivity of the birefringence to the waveguide's widths 147, 148. However, a thickness of 0.28 microns can have a low loss for high-order modes, and hence can cause undesired multi-mode behavior in the optical circuit. Thus, in some embodiments, for example, the core layers 210, 215 can have thicknesses 220, 222 in a range from about 0.1 to 0.2 microns, and more preferably, about 0.16 microns, as a good compromise between maximum mode confinement and rejection of high-order modes. In some cases, it is desirable for the core layers 210, 215 to have the same thicknesses 220, 222 because such embodiments require fewer steps to fabricate than embodiments where different thicknesses 220, 222 are used.

In addition to adjusting the widths 147, 148 to be greater than the thicknesses 220, 222 to impart birefringence, the particular widths 147, 148 selected for the cores 210, 215 can depend upon a number of other factors. These factors include: the wavelength ($\lambda$) of the incoming light 140, the lengths (L) of the waveguides 115, 120 and the refractive indexes (n) of the materials that the waveguides 115, 120 are composed of. In general, the difference in the refractive indexes for TE and TM polarized light passing through the two waveguides 115, 120 is given by $\Delta n_{te-tm} = n_{te} - n_{tm}$(first waveguide)$- n_{te} - n_{tm}$(second waveguide). The relationship between L, $\lambda$ and $\Delta n_{te-tm}$, in order to create a polarization splitter, is given by: $L = \lambda / 2 \cdot n_{te-tm}$.

Consider, an example embodiment where the $\lambda$ equals a C-band wavelength, the waveguide's lengths 155, 157 (FIG. 1) both equal about 460 microns and, both waveguides 115, 120 include planar cores 210, 215 of InGaAsP on an indium phosphide substrate 130, the cores 210, 215 both having thicknesses 220, 222 of about 0.2 microns. To achieve the desired split in the TE and TM polarized light output 150, 152 from the second coupler 125, the first core width 147 can be in a range of about 3.0 to 4.5 microns, and, the second core width 148 can be in a range of about 1.0 to 2.5 microns. In some embodiments the core widths 147, 148 are about 2.0 and about 3.5 microns, respectively. In some cases, such core widths 147, 148 can cause a refractive index difference between TE and TM polarized light (e.g., $n_{te} - n_{tm}$) between the two waveguides 115, 120 (e.g., $\Delta n_{te-tm}$) equals about $1.7 \times 10^{-3}$.

When the input light beams 142, 143 are adjusted as described above after passing through the waveguides 115, 120, the second coupler 125 can cause constructive and destructive interference between the output light beams 144, 145 such that one second coupler output light 150 is substantially TE polarized light, while another second coupler output light 152 is substantially TM polarized light. For instance, for one second coupler output light 150 the TE polarized light in the first and the second input light beams 142 143 are constructively interfered, while the TM polarized light is destructively interfered. In contrast, for the other second coupler output light 152, the TE polarized light in the first and the second input light beams 142 143 are destructively interfered, while the TM polarized light is constructively interfered.

Although the above-described design creates the difference in phase between TE and TM output light beams 150, 152, it is also desirable for the difference in phase for TE portion of the light 144, 145 passing through the two waveguides 115, 120 to equal about 0 degrees (and, like-wise, the corresponding difference in phase for the TM portion of the light 144, 145 to equal about 180 degrees). However, small fabrication imperfections in the waveguides 115, 120 or other components of the structure 105, can make this constraint difficult to achieve. Therefore, in some embodiments, phase-shifters (not shown) are located on one or both of the waveguides 115, 120. A phase-shifter can facilitate a post-fabrication adjustment of the overall relative phase between the two waveguides 115, 120, so as to achieve the desired constructive interference and destructive interference in the second coupler output light beams 150 and 152. An example type of phase-shifter is a current-injection phase shifter, but other types of phase-shifts (e.g., a thermo-optic phase-shifter) could be used.

Figure 3:
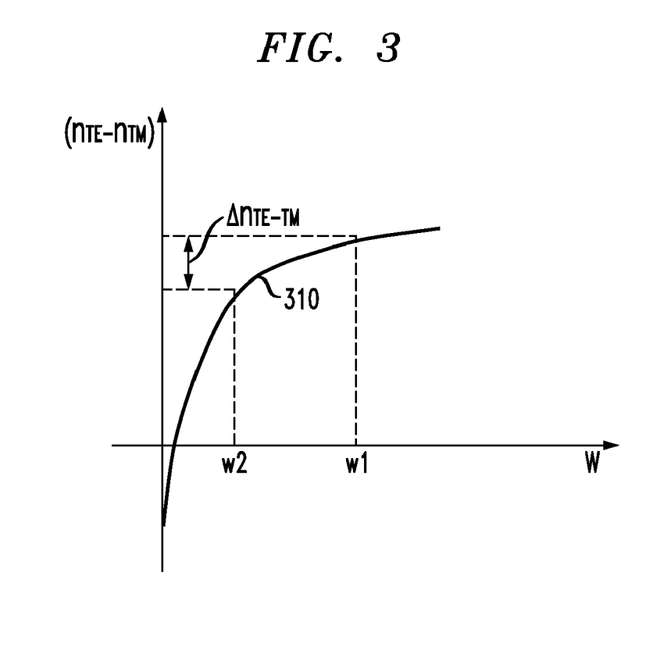
FIG. 3 shows an exemplary plot of the typical relationship between the refractive index difference between TE and TM polarized light ($n_{te}-n_{tm}$) and the width (W) of the waveguides described herein.

A number of different combinations of width 147, 148 can be used to achieve the desired polarized light splitting. For instance, FIG. 3 shows a schematic plot 310 of an example theoretical relationship between the refractive index difference between TE and TM polarized light ($n_{te} - n_{tm}$) and the width (W) of the waveguides described herein. In some cases, it is desirable to use the largest practical core width for the wider core (w1) of the two waveguides (e.g., first core width 147 of the first waveguide 115 in FIG. 1). In this case, the desired $\Delta n_{te-tm}$ (FIG. 3) may be attained without the narrower core (w2) of the two waveguides (e.g., second core width 148 of the second waveguide 120 in FIG. 1) having to be on the steep part of the plot 310.

It may be desirable to avoid overly-narrow core widths (e.g., less than about 0.5 microns in some embodiments) because fabrication variations in the surface roughness of the core's sidewalls 240 can cause undesirable optical insertion losses. As further illustrated in FIG. 3, however, the increase in $n_{te} - n_{tm}$ can become minimal as the core widths increases. For example, there can be a certain maximal core width for which $n_{te} - n_{tm}$ is substantially maximized (e.g., within 90 percent of an asymptotic limit). Additionally, the maximal core width may be limited by practical design constraints, such as the need to avoid exciting high-order waveguide modes of the waveguides 115, 120.

As shown in FIG. 2, the waveguide cores 210, 215 are separated from each other by a distance 245 that is sufficient to prevent interactions between the lights 142, 143 traveling though each waveguide 115, 120. For example, in some embodiments the cores 210, 215 are separated by a distance 245 of about 1.5 microns or greater.

As also shown in FIG. 2, the substrate 130 can be configured to have separate raised portions 250 upon which the waveguide cores 210, 215 are located. For example, when performing an etch to form the cores 210, 215, there can be an over etch to remove exposed portions of the substrate 130 that are not covered by the cores 210, 215 to thereby form the raised portions 250. In other cases, however, there can be a deposited raised portion having a different composition than that of the substrate 130. Forming raised portions 250 can desirably increases the change in birefringence for a given difference in the waveguide core's 210, 215 widths 147, 148. This, in turn, can shortening the waveguide lengths 155, 157 that are needed to achieve the desired phase difference in the output light 150, 152, thus promoting a more compact structure 105. An excessively deep substrate 130 etch is to be avoided because in such cases, waveguide width control over the light phase can become less accurate, and because unwanted energy in high-order modes of the waveguides 115, 120 may not dissipate in the substrate 130 as rapidly as desired. In some embodiments, a height 252 of the raised portions 250 is in the range of about 0.3 to 1.5 microns.

The raised portions 250 can be part of a cladding layer of the waveguides 115, 120. In such instances, the refractive index of the raised portions 250, whether part of the substrate 130 or a separated deposited material, is less than the refractive indexes of the cores 210, 215.

As further shown in FIG. 2, there can also be material layers 255 on the waveguide cores 210, 215. In some cases, the composition of the material layers 255 is the same as the substrate 130. For example, the substrate 130 and material layer 255 be composed of InP. In still other cases, however, the material layers 255 can have a different composition than that of the substrate 130. For the embodiment shown in FIG. 2 the material layer 255 is directly over and covers the tops 257 of the cores 210, 215. The material layers 255 can be part of a cladding layer of the waveguides 115, 120. In such instances, the refractive indexes of the cores 210, 215 are greater than the refractive indexes of the conformal material layers 255.

In some embodiments, therefore, the waveguides 115, 120 can each comprise raised portions 250 and materials layers 255, with the cores 210, 215 there-between, the raised portions 250 and materials layers 255 serving as lower and upper cladding layers, respectively.

In some cases, the side walls 240 (or ridges) of the waveguide cores 210, 215 are adjacent to air. In other cases, as shown in FIG. 2, the side walls 240 can be adjacent to a planarizing material layer 260. The air or planarizing material layer 260 adjacent to the cores 210, 215 can be part of the cladding of the waveguides 115, 120. It is sometimes desirable for the refractive index of the material adjacent to the sidewalls 240 (e.g., air or planarizing material layer 260) to be substantially lower than the refractive indexes of the cores 210, 215 because this can help increase birefringence in the waveguides 115, 120. For example, in some cases, a ratio of the refractive indexes of the cores 210, 215 to that of the air or planarizing material layer 260 is about 1.5 or greater.

As illustrated the planarizing material layer 260 can fill-in lateral regions of the substrate 130 adjacent to the waveguides 115, 120 such that the upper surface 265 of the structure 105 is uniformly planar. Providing a uniform planar surface 265 can facilitate the formation of additional components of the structure 105, such as, metal lines or capacitors (not shown) the surface 265. Additionally, the planarizing material layer 260 helps to prevent the accumulations, near the waveguides 115, 120, of dust or other materials which could affect their function.

In some embodiments, the planarizing material layer 260 has a refractive index that is intermediate between that of air and the refractive index of the cores 210, 215. Having a refractive index intermediate between air and the core 210, 215 may help reduce insertion loss into the waveguides 115, 120 by minimizing the optical losses due to waveguide wall roughness.

As an example, in some cases, when the cores 210, 215 are composed of InGaAsP, the planarizing material layer 260 can be composed of a polymer have a refractive between the refractive index of InGaAsP (about 3.3) and air (about 1). In some cases, the planarizing material layer 260 includes or is a benzocyclobutene (BCB) polymer (refractive index about 1.7).

As shown in FIG. 1, in some cases, the lengths 155, 157 of the waveguides 115, 120 are substantially the same. That is, any difference in the two lengths 155, 157 contribute no more than an about 1 percent phase difference in TE and TM polarized light between the two waveguides 115, 120. In some cases, having substantially the same lengths 155,157 is desirable because having equal lengths 155, 157 make the structure 105 less sensitive to variations in wavelength (e.g., wavelength variations in the incoming light 140). Additionally, the process for constructing the waveguides 115, 120 having substantially the same lengths 155, 157 entails fewer steps than constructing the waveguides 115, 120 with different lengths 155, 157. In other cases, however, different lengths 155, 157 can be advantageously used, for example, to alter which one of the outputs from the second coupler 125 emits the substantially TE or TM polarized light beams 150, 152.

In some embodiments, the first and second cores 210, 215 comprise layers of a same semiconductor alloy. In some cases, the semiconductor alloy is a compound semiconductor. In some cases, the layers of the first and second cores 210 consist essentially of the same semiconductor alloy. That is, there is less than an about 1 percent difference in the constituent elements of the alloy. For example, when the cores 210, 215 are composed of InGaAsP, both cores 210, 215 have the same ratios of In:Ga:As:P to within ±1 percent for each of the elements. Having cores 210, 215 composed of the same alloy can advantageously reduce the number of steps required for the waveguide's fabrication. In other cases, the first and second waveguides 115, 120 can be made of different alloys. For example the two waveguides 115, 120 can have different ratios of In:Ga:As:P, or, can include other elements such as aluminum.

In some embodiments, the substrate 130 can be composed of a second alloy (e.g., a semiconductor alloy), such as InP. In some embodiments where, as discussed above, the substrate 130 serves as a portion of a cladding, the substrate 130 can be composed of a second alloy having a lower refractive index with respect to the incoming light 140 than the refractive index of the first alloy of the cores 210, 215.

Although the example embodiments presented above feature InGaAsP cores and InP substrates, one skilled in the art would understand how the polarization splitters 105 of the disclosure can use different type alloys for the cores 210, 215 and substrate 130.

As noted above, in other embodiments of the apparatus 100, the planar optical structure 105 can be configured as a planar polarization combiner. In such instances, the structure 105 depicted in FIG. 1 has substantially the same components, although these components can be configured to process light passing in the opposite direction than depicted in FIG. 1. For instance, the planar polarization combiner 105 includes an input coupler 125, first and second waveguides 115, 120 and an output coupler 110, all located on the planar substrate 130. The input coupler 125 (e.g., a 2-by-2 coupler) is configured to transmit two separate incoming light beams 150, 152 where the first input light 150 is substantially transverse electric polarized light and the second input light 152 that is substantially transverse magnetic polarized light. In other cases, the first and second input lights 150, 152 are substantially transverse electric magnetic and electric polarized lights, respectively. Each of the first and second waveguides 115, 120 are configured to receive one of the two input light beams 150, 152, and the first waveguide 115 has a first core 210 with a width 147 that is greater than a second core width 145 of the second waveguide 120. The output coupler 110 (e.g., a 2-by-1 coupler) is configured to receive the input lights 142, 143 after passage through the first and second waveguides 115, 120. A single output light 140 from the output coupler 110 has both transverse electric polarized light and transverse magnetic polarized light.

Figure 4:
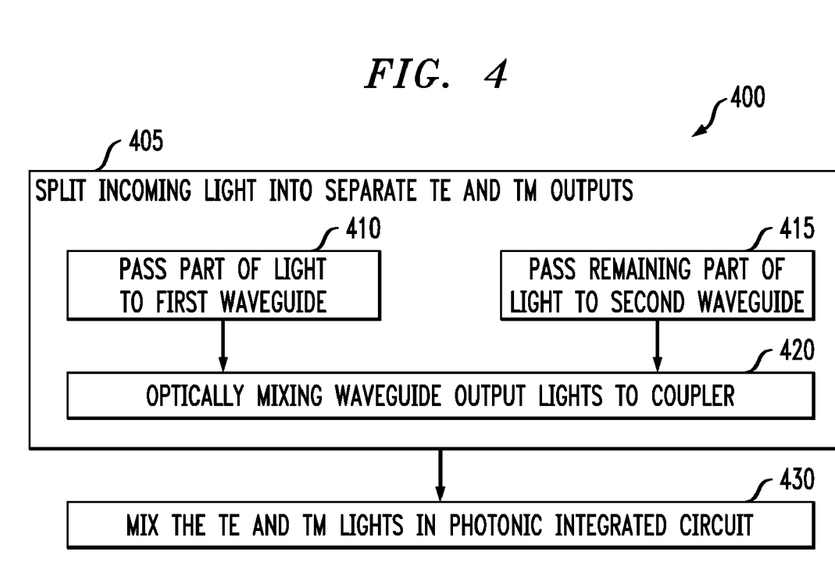
FIG. 4 presents present a flow diagram of an example method of using an apparatus having a planar optical structure therein, e.g., as in FIGS. 1-2.

Another aspect of the present disclosure is a method of using the above-described apparatus. FIG. 4 presents a flow diagram of an example method 400 of using an apparatus having a planar optical structure therein, e.g., configured as a splitter, as in FIGS. 1-2.

With continuing reference to FIGS. 1-2, the method 400 comprises a step 405 of splitting an incoming light 140 (e.g., coherent or incoherent light) into separate TE and TM polarized light outputs 150, 152. Splitting the incoming light 140 (step 405) includes a step 410 of passing a part of the incoming light 150 to a first planar waveguide 115 of a planar polarization splitter 105, and, a step 415 passing a remaining part of the incoming light 152 (e.g., a mutually coherent light, in some cases) to a second planar waveguide 120 of the planar polarization splitter 105. At least one of the first or second planar waveguides 115, 120 is birefringent. The first waveguide 115 has a first core 210 with a width 145 (e.g., first core width) that is greater than a width 147 (e.g., second core width) of a second core 215 of the second waveguide 120. In some embodiments, steps 410, 415 are facilitated by passing the incoming light 140 through an input coupler (e.g., a 1-by-2 coupler) which distributes equal portions of the incoming light 140 to the two waveguides 115, 120.

Splitting the incoming light 140 (step 405) further includes a step 420 of optically mixing output lights 148, 149 from the first and second planar waveguides 115, 120 to an output coupler 125 of the splitter 105. As discussed above, there are constructive and destructive interferences between the differently phased TE and TM polarized light in the output coupler 125. As a result, a portion of an output light 150 from the output coupler 125 is substantially the desired TE polarized light and a remaining portion of the output light 152 from the output coupler 125 is substantially the desired TM polarized light.

Some embodiments of the method 400 further include a step 430 of mixing the substantially TE polarized light 150 and the substantially TM polarized light 152, in a photonic integrated circuit 100 to beat with a reference signal so as to demodulate (e.g., decode) information from an incoming signal 140 (e.g., demodulate the phase of a reference signal). For example, modulating the phase in step 430 can include polarization multiplexing such as an offset quadrature phase-shift keying (OQPSK). One of ordinary skill in the art would understand how these steps or additional procedures could be used to transmit or receive information encoded in the light passed though the circuit 100, such as described in Doerr et al.

Figure 5:
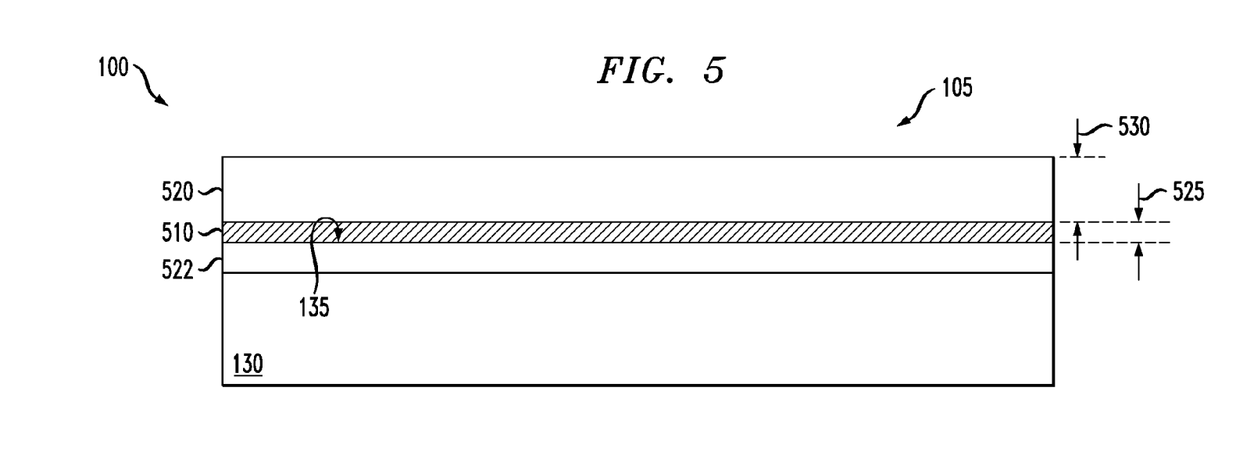
FIGS. 5-7 present cross-sectional views of selected steps in an example method of manufacturing an apparatus having a planar optical structure therein, e.g., as in FIGS. 1-2.
Figure 6:
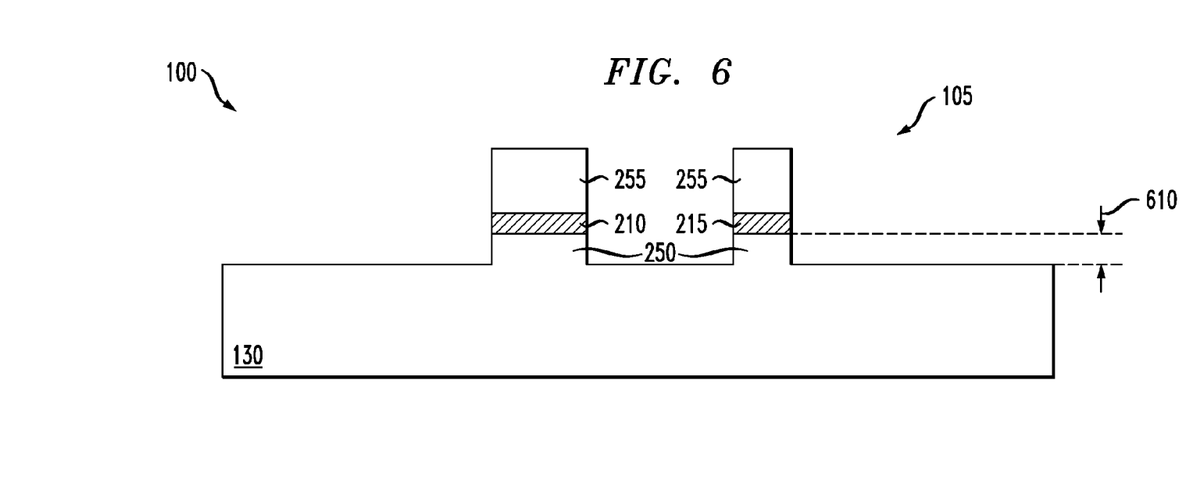
Figure 7:
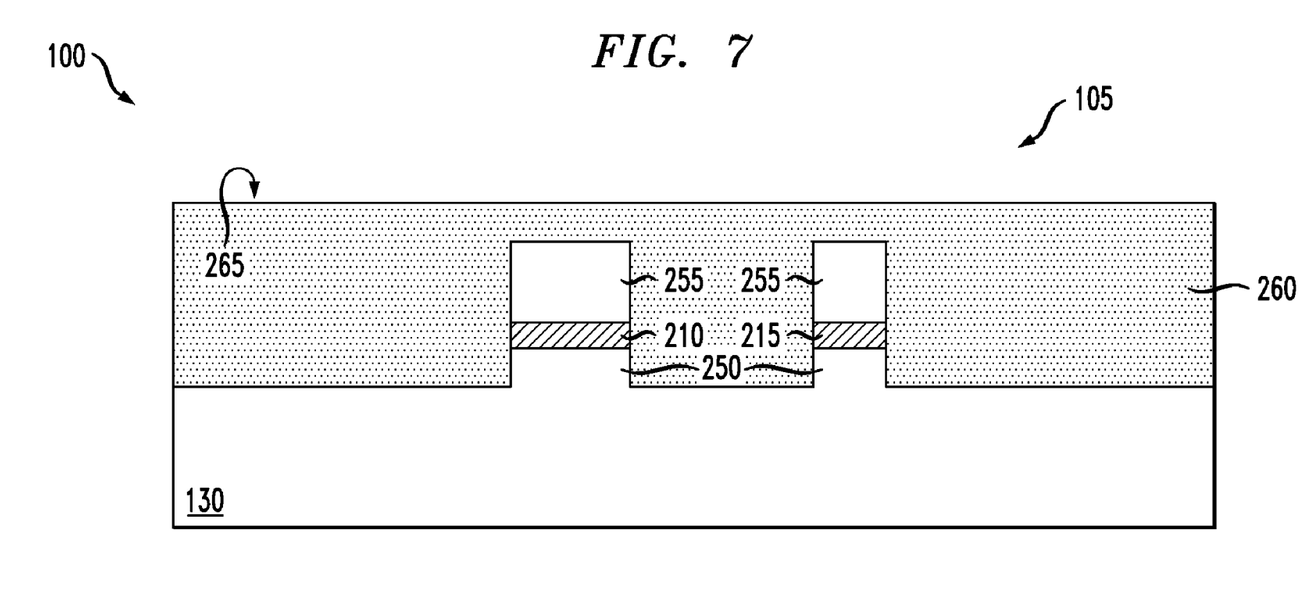

Another aspect of the present disclosure is a method of manufacturing an apparatus. FIGS. 5-7 present cross-sectional views of selected steps in an example method of manufacturing an apparatus having a planar optical structure therein, e.g., a splitter such as in FIGS. 1-2. For clarity, the same reference numbers are used to depict the same structures. In particular, FIGS. 5-7 show selected steps in the fabrication of an example optical structure 105.

FIG. 5 shows a cross-sectional view of the partially-fabricated planar optical structure 105 (e.g., a splitter combiner or polarizer), analogous to the view depicted in FIG. 2. FIG. 5 shows the partially-fabricated structure 105 after forming a semiconductor alloy layer 510 on a planar substrate 130. FIG. 5 also shows the structure 105 after forming a material layer 520 on the alloy layer 510. To facilitate forming birefringent waveguides 115, 120, the material layer 520 and the substrate 130 have refractive indexes that are less than the alloy layer 510. For example, an InGaAsP alloy layer 510 can be grown on the planar surface 135 of an InP substrate 130 and an InP material layer 520 can be grown on the planar InGaAsP layer 510. In some embodiments, the alloy layer 510 has a thickness 525 in the range of about 0.1 to 0.2 microns, and, the material layer 520 has a thickness 530 in the range of about 1 to 3 microns.

One skilled in the art would be familiar with the types of conventional crystal growing techniques (e.g., metal-organic vapor phase epitaxy) that could be used for forming such layers 510, 520. For example, starting with a substrate 130 of a InP wafer substrate 130, a lower cladding 522 of InP, an InGaAsP core 510, and an InP upper cladding 520 could be successively grown on the substrate 130 in a process using, for example, a metal-organic chemical vapor deposition (MOCVD) machine.

FIG. 6 shows a cross-sectional view the partially-fabricated structure 105 of FIG. 5 after patterning the material layer 520 and the alloy layer 510 (FIG. 5) to form separated first and second waveguides 115, 120 having cores 210, 215 and material layers 255 thereon. A first core width 145 (e.g., of the first waveguide 115) is greater than a second core width 147 (e.g., of the second waveguide 120). At least one of said first or second planar waveguides 115, 120 is birefringent. Any conventional photolithographic patterning processes (e.g., forming patterned masks and wet or dry etching) can be used to pattern the layers 510, 520 into the waveguide's shapes. For example, a hard mask layer (e.g., silica) can be deposited and then patterned and etched to provide a hard mask for the waveguide's etching, and then the hard mask removed. Then, the birefringent waveguides 115, 120 can be formed from the substrate 130 (and optional layer 522), material layer 520 and the alloy layer 510 (FIG. 5) can be etched using reactive ion etching (RIE) or inductively coupled plasma etching (ICP). As shown in FIG. 6, the patterned material layer 255 can conformally cover the patterned cores 210, 215. That is the patterned material layer 255 have substantially the same perimeters as the patterned cores 210, 215.

As further illustrated in FIG. 6, in some embodiments the patterning process includes removing portions of the substrate 130 (and optional layer 522) not covered by the cores 210, 215 so as to form raised portions 250 of the substrate 130 that are located directly underneath the first and second waveguide cores 210, 215. That is, the first and second cores 210, 215 are located on separate ones of the raised portions 250. For instance, the above-described etching processes can be continued so as to etch away an about 0.3 to 1.5 micron thickness 610 of the substrate 130.

FIG. 7 shows a cross-sectional view the partially-fabricated structure 105 of FIG. 6 after depositing a planarizing layer 260 over the material layers 255 and the waveguide cores 210, 215 such that an upper surface 265 of the polarization structure 105 is planar. In some embodiments the planarizing layer 260 is a polymer layer (e.g., a benzocyclobutene polymer layer) that is spin-coated over the substrate 130 and then heated so as to uniformly cover the conformal material layers 255, the waveguide cores 210, 215 and adjacent spaces.

Forming the planar optical structure 105 can further include forming an input coupler 110 (e.g., 1-by-2 coupler, for a splitter or polarizer embodiment) and an output coupler 125 (e.g. 2-by-2 coupler for a splitter or polarizer embodiment) on the substrate (FIG. 1). The couplers 110, 125 are formed such that one end 170 of the input coupler 110 is optically connected to input ends 171, 172 of the first and second waveguides 115, 120, and, such that one end 175 of the 2-by-2 coupler 125 is optically connected to output ends 176, 177 of the first and second waveguides 115, 120. The couplers 110, 125 can be formed at the same time as the waveguides 115 and 120, and using the same process as described above for forming the waveguides 115, 120.

One skilled in the art would be familiar with additional processes to complete the fabrication of the planar optical structure 105, including forming phase-shifters and metal lines and capacitors (not shown) on a planar upper surface 265 of the polarization structure 105 (FIG. 1). Forming the planar optical structure 105 can be part of forming the apparatus 100 configured as a photonic integrated circuit.

Although the embodiments have been described in detail, those of ordinary skill in the art should understand that they could make various changes, substitutions and alterations herein without departing from the scope of the disclosure.

What is claimed is:

1. An apparatus, comprising:
a planar optical structure, including:
an input coupler on a planar substrate, said input coupler configured to divide an incoming light into two light beams;
first and second planar waveguides on said planar substrate, each of said first and second waveguides being configured to receive one of said two light beams, wherein said first waveguide has a single layer first core with a width that is greater than a width of a single layer second core of said second waveguide, and, at least one of said first or second planar waveguides is birefringent; and
an output coupler on said planar substrate, said output coupler configured to receive said light beams after passage through said first and second waveguides, wherein a first output light beam from said output coupler is substantially transverse electric polarized light and a second output light beam from said output coupler is substantially transverse magnetic polarized light,
wherein said first and second cores have vertical thicknesses that are less than said first core width and said second core width.

2. The apparatus of claim 1, wherein said planar optical structure is configured to be one selected from the group consisting of: a planar polarization splitter, planar polarization combiner and a planar polarizer.

3. The apparatus of claim 1, wherein said first and second cores are layers that have vertical thicknesses in a range from about 0.1 to 0.2 microns and said first core width is in a range of about 3.0 to 4.5 microns and said second core width is in a range of about 1.0 to 2.5 microns.

4. The apparatus of claim 1, wherein said first and second cores both comprise layers of a same semiconductor alloy.

5. The apparatus of claim 1, wherein said first and second cores are both composed of indium gallium arsenide phosphide and said substrate is composed of indium phosphide.

6. The apparatus of claim 1, wherein said first and second cores are composed of a first semiconductor alloy having a first refractive index, and, said first and second waveguides are located on said substrate comprising a second semiconductor alloy cladding, said second semiconductor alloy cladding having a lower refractive index with respect to said incoming light than said first alloy.

7. The apparatus of claim 3, wherein sidewalls of said waveguide cores are adjacent to a cladding material, wherein a ratio of a refractive index of said first and second waveguides to a refractive index of said adjacent cladding material is about 1.5 or greater.

8. The apparatus of claim 3, wherein said first and second waveguides have substantially the same length.

9. The apparatus of claim 3, wherein said input coupler is a 1-by-2 coupler and said output coupler is a 2-by-2 interference coupler.

10. The apparatus of claim 3, wherein both of said first and second planar waveguides are birefringent.

11. The apparatus of claim 3, wherein said planar optical structure configured as a planar polarization splitter is configured to polarization separate said incoming light in a C-band wavelength range.

12. The apparatus of claim 1, wherein said first and second cores have vertical thicknesses that are less than 0.28 microns.

13. The apparatus of claim 1, wherein a length of said first and second planar waveguides is less than about 500 microns.

14. An apparatus, comprising:
a planar optical structure, including:
an input coupler on a planar substrate, said input coupler configured to divide an incoming light into two light beams;
first and second planar waveguides on said planar substrate, each of said first and second waveguides being configured to receive one of said two light beams, wherein said first waveguide has a single layer first core with a width that is greater than a width of a single layer second core of said second waveguide, and, at least one of said first or second planar waveguides is birefringent; and
an output coupler on said planar substrate, said output coupler configured to receive said light beams after passage through said first and second waveguides, wherein a first output light beam from said output coupler is substantially transverse electric polarized light and a second output light beam from said output coupler is substantially transverse magnetic polarized light,
wherein said first and second waveguide cores are located in-between raised portions of said substrate located below said first and second waveguide cores, and material layers, which are located on said first and second waveguide cores said raised portions and material layer serving as lower and upper cladding layers, respectively.

15. A method of manufacture, comprising:
fabricating a planar optical structure, including:

forming a semiconductor alloy layer on a planar substrate;

forming a material layer on said semiconductor alloy layer, wherein said material layer and said substrate have refractive indexes that are less than a refractive index of said semiconductor alloy layer; and patterning said material layer and said semiconductor alloy layer to form separated first and second waveguides, wherein a width of a single layer first core composed of said semiconductor alloy layer of said first waveguide is greater than a width of a single layer second core composed of said semiconductor alloy layer of said second waveguide, and, at least one of said first or second planar waveguides is birefringent, wherein said patterning further includes removing portions of said substrate not covered by said first and second cores to form raised portions that said first and second cores are located on, wherein a ratio of refractive indexes of said first and said second cores to both of said raised portions and said material layers is about 1.5 or greater.

16. The method of claim 15, wherein forming said structure further includes depositing a planarizing layer over said material layer and first and second cores such that an upper surface of said polarization structure is planar.

17. The method of claim 15, wherein forming said structure further including forming a 1-by-2 input coupler and a 2-by-2 output coupler on said planar substrate such that one end of said 1-by-2 input coupler is optically connected to input ends of said first and second waveguides, and one end of said 2-by-2 coupler is optically connected to output ends said first and second waveguides.

18. The method of claim 15, wherein forming said polarization structure is part of forming a photonic integrated circuit.

* * * * *